United States Patent
Berchin et al.

(10) Patent No.: US 9,405,015 B2
(45) Date of Patent: Aug. 2, 2016

(54) METHOD AND APPARATUS FOR MODELING OF GNSS PSEUDORANGE MEASUREMENTS FOR INTERPOLATION, EXTRAPOLATION, REDUCTION OF MEASUREMENT ERRORS, AND DATA COMPRESSION

(71) Applicant: SUBCARRIER SYSTEMS CORPORATION, Glendora, CA (US)

(72) Inventors: Gregory John Berchin, Lake Saint Louis, MO (US); David Charles Kelley, Glendora, CA (US)

(73) Assignee: SubCarrier Systems Corporation, Glendora, CA (US)

( * ) Notice: Subject to any disclaimer, the term of this patent is extended or adjusted under 35 U.S.C. 154(b) by 983 days.

(21) Appl. No.: 13/718,210

(22) Filed: Dec. 18, 2012

(65) Prior Publication Data

US 2015/0301189 A1    Oct. 22, 2015

(51) Int. Cl.
| | |
|---|---|
| *G01S 19/44* | (2010.01) |
| *G01S 19/07* | (2010.01) |
| *G01S 19/40* | (2010.01) |
| *G01S 19/41* | (2010.01) |
| *G01S 19/04* | (2010.01) |
| *G01S 19/43* | (2010.01) |

(52) U.S. Cl.
CPC ............ *G01S 19/40* (2013.01); *G01S 19/04* (2013.01); *G01S 19/07* (2013.01); *G01S 19/41* (2013.01); *G01S 19/43* (2013.01)

(58) Field of Classification Search
USPC ............. 342/357.23, 357.27, 357.4, 357.46, 342/357.41, 357.44; 701/468, 473
See application file for complete search history.

(56) References Cited

U.S. PATENT DOCUMENTS

| | | |
|---|---|---|
| 3,697,875 A | 10/1972 | Guanella |
| 4,812,991 A | 3/1989 | Hatch |
| 4,963,889 A | 10/1990 | Hatch |
| 5,148,179 A | 9/1992 | Allison |
| 5,225,842 A | 7/1993 | Brown |
| 5,282,224 A | 1/1994 | Harada |
| 5,323,322 A | 6/1994 | Mueller et al. |
| 5,376,968 A | 12/1994 | Wu |
| 5,379,224 A | 1/1995 | Brown et al. |
| 5,442,363 A | 8/1995 | Remondi |
| 5,471,217 A | 11/1995 | Hatch et al. |
| 5,477,228 A | 12/1995 | Tiwari |
| 5,477,458 A | 12/1995 | Loomis |

(Continued)

OTHER PUBLICATIONS

Geoffrey Blewitt, "Basics of the GPS Technique: Observation Equations," Department of Geomatics, University of Newcastle, pp. 1-46, 1997.

(Continued)

*Primary Examiner* — Dao Phan
(74) *Attorney, Agent, or Firm* — Robert Plotkin, P.C.; Robert Plotkin

(57) ABSTRACT

Polynomial regression models are used to reduce errors in measurements of pseudorange between a GNSS satellite and a receiving station; for data compression by replacing a large number of measurements with a small number of coefficients of the model polynomial, optionally combined with modeling residuals; for extrapolating usefully accurate estimates of future range between the GNSS satellite and the receiving station; and for providing usefully accurate estimates of future coefficient values of the polynomial regression models themselves.

14 Claims, 8 Drawing Sheets

(56) References Cited

U.S. PATENT DOCUMENTS

| | | | |
|---|---|---|---|
| 5,523,763 | A | 6/1996 | Loomis |
| 5,602,741 | A | 2/1997 | Talbot |
| 5,701,302 | A | 12/1997 | Geiger |
| 5,717,716 | A | 2/1998 | Doyle |
| 5,745,075 | A | 4/1998 | Enge |
| 5,757,646 | A | 5/1998 | Talbot |
| 5,862,177 | A | 1/1999 | Cummings |
| 5,884,220 | A | 3/1999 | Farmer |
| 5,890,091 | A | 3/1999 | Talbot et al. |
| 5,892,847 | A | 4/1999 | Johnson |
| 5,899,957 | A | 5/1999 | Loomis |
| 5,903,654 | A | 5/1999 | Milton et al. |
| 5,920,593 | A | 7/1999 | Perl |
| 5,935,194 | A | 8/1999 | Talbot et al. |
| 5,945,933 | A | 8/1999 | Kalkstein |
| 5,973,639 | A | 10/1999 | Biacs |
| 6,002,363 | A | 12/1999 | Krasner |
| 6,016,117 | A | 1/2000 | Nelson, Jr. |
| 6,091,773 | A | 7/2000 | Sydorenko |
| 6,229,478 | B1 | 5/2001 | Biacs et al. |
| 6,268,824 | B1 | 7/2001 | Zhodzishky et al. |
| 6,313,787 | B1 | 11/2001 | King et al. |
| 6,324,473 | B1 | 11/2001 | Eschenbach |
| 6,400,760 | B1 | 6/2002 | Gu |
| 6,429,811 | B1 | 8/2002 | Zhao |
| 6,437,734 | B1 | 8/2002 | McBurney et al. |
| 6,879,283 | B1 | 4/2005 | Bird et al. |
| 6,882,314 | B2 | 4/2005 | Zimmerman et al. |
| 6,934,632 | B2 | 8/2005 | Hatch |
| 6,961,018 | B2 | 11/2005 | Heppe et al. |
| 7,020,555 | B1 | 3/2006 | Janky |
| 7,143,191 | B2 | 11/2006 | Chuah |
| 7,248,211 | B2 | 7/2007 | Hatch et al. |
| 7,378,992 | B2 | 5/2008 | Fallon |
| 7,397,850 | B2 | 7/2008 | Easley |
| 7,519,383 | B2 | 4/2009 | Olgaard |
| 7,579,984 | B2 | 8/2009 | Wang et al. |
| 7,586,438 | B1 | 9/2009 | Lawrence |
| 7,623,067 | B2 | 11/2009 | Raman et al. |
| 7,639,739 | B2 | 12/2009 | Rose |
| 7,679,555 | B2 | 3/2010 | Dai et al. |
| 7,711,480 | B2 | 5/2010 | Robbins |
| 7,714,747 | B2 | 5/2010 | Fallon |
| 7,746,802 | B2 | 6/2010 | Suh |
| 7,751,974 | B2 | 7/2010 | Brodie et al. |
| 7,898,472 | B2 | 3/2011 | Zeng |
| 7,961,141 | B2 | 6/2011 | Dai et al. |
| 7,982,667 | B2 | 7/2011 | Vollath et al. |
| 7,991,044 | B1 | 8/2011 | Brown |
| 8,004,462 | B2 | 8/2011 | LaMance et al. |
| 8,031,111 | B2 | 10/2011 | Ferguson |
| 8,077,085 | B2 | 12/2011 | Huang |
| 8,085,175 | B2 | 12/2011 | Velazquez |
| 8,085,196 | B2 | 12/2011 | Whitehead |
| 8,107,524 | B2 | 1/2012 | Laksono |
| 8,125,382 | B2 | 2/2012 | Derbez et al. |
| 8,130,143 | B2 | 3/2012 | Liu et al. |
| 8,134,497 | B2 | 3/2012 | Janky et al. |
| 8,134,499 | B2 | 3/2012 | Wang et al. |
| 8,174,437 | B2 | 5/2012 | Whitehead |
| 8,213,368 | B2 | 7/2012 | Hui |
| 8,233,556 | B2 | 7/2012 | Waters |
| 8,242,953 | B2 | 8/2012 | Dai et al. |
| 8,242,956 | B2 | 8/2012 | LaMance et al. |
| 8,259,008 | B2 | 9/2012 | Farmer |
| 8,264,404 | B2 | 9/2012 | Remondi et al. |
| 8,271,194 | B2 | 9/2012 | Whitehead et al. |
| 8,428,113 | B1 | 4/2013 | Katic |
| 8,638,845 | B2 | 1/2014 | Hatakawa |
| 8,819,110 | B2 | 8/2014 | Jin |
| 8,879,672 | B2 | 11/2014 | Jung |
| 2002/0126046 | A1 | 9/2002 | Counselman, III et al. |
| 2003/0142656 | A1 | 7/2003 | Padovani et al. |
| 2004/0145518 | A1 | 7/2004 | Toda et al. |
| 2005/0002481 | A1 | 1/2005 | Woo et al. |
| 2005/0110676 | A1 | 5/2005 | Heppe et al. |
| 2005/0146461 | A1 | 7/2005 | Pande et al. |
| 2007/0252758 | A1 | 11/2007 | Loomis |
| 2008/0036655 | A1 | 2/2008 | Pitt et al. |
| 2008/0191936 | A1 | 8/2008 | Phatak |
| 2009/0167599 | A1 | 7/2009 | Johnson |
| 2010/0161568 | A1 | 6/2010 | Xiao |
| 2010/0231448 | A1 | 9/2010 | Harper |
| 2011/0169689 | A1 | 7/2011 | Wang et al. |
| 2012/0236907 | A1 | 9/2012 | Branch |
| 2013/0335266 | A1 | 12/2013 | Vollath |
| 2014/0253369 | A1 | 9/2014 | Kelley |

OTHER PUBLICATIONS

PlanetMath.org paper in 3 pages, web printout Nov. 18, 2012.

Polynomial Functions paper in 6 pages, web printout Nov. 18, 2012.

Polynomial Regression Models paper in 3 pages, web printout Nov. 18, 2012.

Radio Technical Commission for Maritime Services, "Radio Technical Commission for Maritime Services Standard Development Policies," Version 1.0, Oct. 5, 2005, 13 pages.

Radio Technical Commission for Maritime Services—Developed by RTCM Special Committee No. 104, RTCM 10402.3 Recommended Standards for Differential GNSS (Global Navigation Satellite Systems) Services, 194 pages, Aug. 20, 2001.

Radio Technical Commission for Maritime Services—Developed by RTCM Special Committee No. 104, RTCM Standard 10403.1 Differential GNSS (Global Navigation Satellite Systems) Services—Version 3, 208 pages Jul. 1, 2011.

Radio Technical Commission for Maritime Serives—Developed by RTCM Special Committee No. 104, RTCM 10402.3 Recommended Standards for Differential GNSS (Global Navigation Satellite Systems) Services, 194 pages. Aug. 20, 2001.

Mark Schenewerk, "A Brief Review of Basic GPS Orbit Interpolation Strategies", GPS Solutions (2003) 6:265-267, published online: Nov. 9, 2002.

Nikolaj Popv and Tudor Jeblean, "A complete Method for Algorithm Validation" Research Institute for Sumbolic Computation, Johannes Kepler University, Linz, Austria, 5 pages website printout Nov. 30, 2012.

Gordon K. Smyth, "Polynomical Approximation" Encyclopedia of Biostatistics (ISBN 0471 975761), 13 pages 1998.

Geoffrey Blewitt, "Basics of the GPS Technique: Observation Equations"; Department of Geomatics, University of Newcastle, pp. 1-46, 1997.

Ghangho Kim, Sanghoon Jeon, Chongwon Kim, Deokhwa Han, Changdon Kee, Sujin Choi; "A Combined Numerial-Empirial Orbit Propagation Algorithm for Satellite Tracking and Backup Navigation System", pp. 812-819, International Technical Meeting (ITM) of the Institute of Navigation, Newport Beach, CA. Jan. 30-Feb. 1, 2012.

Mojtaba Bhrami and Marek Ziebart, "A Kalman Filter-based Doppler-smoothing of Code Pseudoranges in GNSS-Challenged Environments", pp. 2362-2372, 24th International Technical Meeting of the Satellite Division of the Institute of Navigation, Portland OR, Sep. 19-23, 2011.

Xin-Xiang Jin, "Algorithm for Carrier Adjusted DGPS Positioning", Delft Geodetic Computing Centre faculty of Geodetic Engineering Delft University of Technology, 10 pages 1996.

Masayuki Saito, Yuki Sato, Masakazu Miya, Mitsuhide Shima, Yuji Omura, Junichi Takiguchi, Koki Asari; "Centimeter-class Augmentation System Utilizing Quasi-Zenith Satellite System", pp. 1243-1253, 24th International Technical Meeting of the Satellite Division of the Institute of Navigation, Portland, OR, Sep. 19-23, 2011.

Aubrey Chen, Tood Walter, Per Enge, "Combination of WASS and Klobuchar Ionospheric Corrections for non-Aviation Applications", pp. 617-623, Proceeding of the IAIN World Congress in Associates with U.S. ION Annual Meeting, Jun. 26-28, 2000, San Diego, CA.

Gethin Roberts, Emily Cosser, Xiaolin Meng, Alan Dodson, "Creating Virtual L2 GPS Data Using a Combination of L1 Receivers and L1/L2 Reference Receivers", pp. 1408-1413, ION GPS 2002, Sep. 24-27, 2002, Portland, OR.

(56) References Cited

OTHER PUBLICATIONS

Paula Korvenoja, Robert Piché, "Efficient Satellite Orbit Approximation", pp. 1930-1937, ION GPS 2000, Sep. 19-22, 2000, Salt Lake City, UT.
Sunil B. Bisnath, "Efficient, Automated Cycle-Slip Correction of Dual-Frequency Kinematic GPS Data", pp. 145-154, ION GPS 2000, Sep. 19-22, 2000, Salt Lake City, UT.
Paul Collins, "Isolating and Estimating Undifferenced GPS Integer Ambiguities" pp. 720-732, ION NTM 2008, Jan. 28-30, 2008, San Diego, CA.
Peter Kielland, Tony Tubman, "On Estimating Map Model Errors and GPS Position Errors (Applying More Science to the Art of Navigation)", pp. 869-881, Proceedings of the 1994 National Technical Meeting of The Institute of Navigation, Jan. 24-26, 1994, San Diego, CA.
J. Arnold Soltz, Andrea M. Johnson, "Optimal Estimation of Dynamic Ionosphere Induced Group Delays of GPS Signals", pp. 485-495, ION 63rd Annual Meeting, Apr. 23-25, 2007, Cambridge, MS.
Euiho Kim, Tood Walter, J. David Powell, "Optimizing WAAS Accuracy/ Stability for a Single Frequency Receiver", pp. 962-970, ION GNSS 19th International Technical Meeting of the Satellite Dvision, Sep. 26-29, 2006, Forth Worth, TX.
Jong-Hoon Won, Dominik Dötterböck, Bernd Eissfeller, "Performance Comparison of Different Forms of Kalman Filter Approach for a Vector-Based GNSS Signal Tracking Loop", pp. 3037-3048, 22nd International Meeting of the Satellite Division of the Institute of Navigation, Sep. 22-25, 2009, Savannah, GA.
Onsy Abdel Alim, Ahmed El-Rabbany, Refaat Rashsd, Mohamed Mohasseb, "Pseudorange Correction Prediction Using Artificial Neural Network", pp. 396-399, ION NTM 2006, Jan. 18-20, 2006, Monterey, CA.
Jian Wang, Jinling Wang, Craig Roberts, "Reducing Carrier Phase Errors with EMS-Wavelet for Precise GPS Positioning", pp. 919-928, ION NTM2007, Jan. 22-24, 2007, San Diego, CA.
Yanming Feng, Yi Zheng, Zhengdong Bai, "Representing GPS Orbits and Corrections Efficiently for Precise Wide Area Positioning", pp. 2316-2323, ION GNSS 17th International Technical Meeting of the Satellite Division, Sep. 21-24, 2004, Long Beach, CA.
Christopher Hegarty, M. Bakry El-Arini, Taehwan Kim, Swen Ericson, "Scintillation Modeling for GPS/WAAS Receivers", pp. 799-807, Proceedings of the 1999 National Technical Meeting of the Institute of Navigation, Jan. 25-27, 1999, San Diego, cA.
Luiz Carlos Laureano Da Rosa, Diego Rolando Mendez Castillo, Fernando Walter, "Stastical Model to Minimize the GPS System Errors: A Tool to Support DGPS/GBAS", pp. 2640-2647, ION GPS 2002, Sep. 24-27, 2002, Portland, OR.
Jinling Wang, "Stochastic Assessment of the GPS Measurements for Precise Positioning", pp. 81-89, Proceedings of The 11th International Technical Meeting of the Satellite Division of the Institute of Navigation (ION GPS 1998) Sep. 15-18, 1998, Nashville, TN.
Dr. Lawrence R. Weill, "Theory and Applications of Signal Compression in GNSS Receivers", pp. 708-719, ION GNSS 20th International Technical Meeting of the Satellite Division, Sep. 25-28, 2007, Forth Worth, TX.
Gerald L. Mader, Michael L. Morrison, "Using Interpolation and Extrapolation Techniques to Yield High Data Rates and Ionosphere Delay Estimates from Continuously Operating GPS Networks", pp. 2342-2348, ION GPS 2002, Sep. 24-27, 2002, Portland, OR.
Radio Technical Commision for Maritime Services, "Radio Technical Commission for Maritime Services Standard Development Policies", Version 1.0 Oct. 5, 2005, 13 pages.
Radio Technical Commission for Maritime Services—Developed by RTCM Committee No. 104, "RTCM Standard 10410.1 Networked Transport of RTCM via Internet Protocol (Ntrip)—Version 2.0", 36 pages, Jun. 28, 2011.
Radio Technical Commission for Maritime Services—Deceloped by RTCM Special Committee No. 104, "RTCM Standard 10401.2 for Differential Naystar GPS Reference Stations and Integrity Monitors (RSIM)" pp. 1-114, Dec. 18, 2006.
National Aeronautics and Space Administration Gooddard Space Flight Center, "Gravity Recovery and Climate Experiment (GRACE)", 2 page paper printed Nov. 30, 2012.
PCT Notification of Transmittal of the International Search Report and The Written Opinion of the International Searching Authority, or the Declaration, mailing date Mar. 11, 2014.

General Logic for reference platform

Rover logic detailed logic of an example

METHOD AND APPARATUS FOR MODELING OF GNSS PSEUDORANGE MEASUREMENTS FOR INTERPOLATION, EXTRAPOLATION, REDUCTION OF MEASUREMENT ERRORS, AND DATA COMPRESSION

STATEMENT AS TO FEDERALLY SPONSORED RESEARCH

This invention was made with government support under contract number DTR57-12-C-10006 awarded by the Volpe Center of the Research and Innovative Technology Administration (RITA) of the United States Department of Transportation (DOT). This application is subject to ongoing Licensing and Review consideration.

FIELD OF THE INVENTION

The present application relates generally to reduction of Differential GNSS message payload by mathematical modeling of pseudorange measurement histories observed at GNSS Reference Stations.

BACKGROUND OF THE INVENTION

Global Navigation Satellite Systems (GNSS) have grown beyond GPS and GLONASS with the deployment of new designs including the Japanese QZSS, European Galileo, and Chinese COMPASS systems, all of which follow the same fundamental methods of operation and position determination based on RF radio wave ranging techniques. The use and availability of various corrections to aid in the accuracy obtained from a satellite in a GNSS have grown as well.

To improve the accuracy obtainable for positioning and navigation data using a GNSS receiver, various techniques are employed. Some of these involve algorithmic improvements internal to the devices, others involve aiding the device with externally provided information. At a broad level these latter items fall onto three areas: corrected or improved orbital information, clock drift information, and localized propagation effects from the ionosphere and troposphere.

To overcome the localized propagation effects specifically, many kinematic or stationary positioning applications make use of one or more additional GNSS receivers. In this method, a reference receiver placed at a well-known location, referred to as the reference station, receives the same satellite signals as a remote receiver referred to as the rover. The measurement information obtained by the reference station is then sent to the rover, and used, along with knowledge of the actual position of the reference station, to compute the measurement errors common to both the reference station and the rover. This process typically occurs in real time or near real time, but can also occur in post-processing, where the data may be stored and dealt with when convenient. And multiple rovers may connect to any given reference station via a variety of communications devices (both one way and two way).

By taking the difference between signals received both at the reference station and at the remote rover, common-mode errors are effectively eliminated. This facilitates an accurate determination of the rover's coordinates relative to the reference station's coordinates. When the reference station's coordinates are kinematic (such as the case of nearby operating rovers/vehicles exchanging data), this further facilitates an accurate determination of position of each vehicle relative to the other.

This general technique of differencing signals is known in the art as differential GPS (DGPS) or differential GNSS (DGNSS). When DGPS/DGNSS positioning utilizing one or more carrier phases is done in real time while the rover is semi-static or in motion, it is most often referred to as Real-Time Kinematic (RTK) positioning.

A common feature of all these techniques involves sending either correction or raw measurement data from the reference station to a GNSS rover receiver in the field. A constant stream of this information is then used by the rover to perform pseudo-range adjustments, double differencing, and/or various other techniques known to those skilled in the art to refine the positioning and navigation data calculated by the rover receiver. Loss of, or interruption of, this data stream can in turn be very disruptive to the rover unit. This commonly occurs when various wireless transmissions systems are used. Such systems suffer from the same RF propagation issues as the GNSS signals and may be blocked or suffer from corrupting effects of multipath on the received signal.

The rate of sending such corrections varies with the rover population and the capacity of the delivery media. A variety of delivery media have been successfully used over the years, including dedicated radio links, commercial broadcasting, government operated broadcasting, cellular technologies, paging, Wifi, DSRC, and geostationary and LEO satellite links. A common update rate is at 1 Hz, although faster rates are used when there is need. Lower update rates of 5 to 15 seconds are also found, typically due to limits of the transmission technology. In the USCG NDGPS system, data rates of 50, 100, or 200 bits per second limit both the signal content and the message repetition rates (5 to 10 seconds between updates). In many commercial systems a combination of compression and adaptive scheduling is used to conserve bandwidth. With the advance of widespread TCP/IP connections over wireless and the growth in NTRIP sites, access to many reference stations can be obtained over the Internet at locations well beyond their effective service areas.

There may be a dozen or more GNSS satellites simultaneously in view above the horizon at a given location and time. The general requirement is to provide differential corrections for all signals of each tracked satellite (both code and carrier for L1, L2, L5, and beyond in newer GNS systems). In some applications this may be relaxed if the body of rover devices to be supported does not, or will not, track a given signal of interest. Because the reference station cannot generally know which satellites are in view of each individual rover at any instant in time, it is customary to send information covering the entire sky down to a relatively low elevation mask. As the number of active GNSS satellites deployed continues to grow with the continued deployment of new systems like the European Galileo and the Chinese COMPASS, the bandwidth required to exchange all data necessary for differential corrections will continue to increase as well. Data rates of 15 kbs or more are required today to convey this information for GPS and GLONASS satellites, and even this can be prohibitive and problematic for various reasons.

The problem addressed herein is to generate and transmit the essential error correction information to the rover devices without using excessive bandwidth or being subject to immediate degrading when loss and corruption of one or more messages in a sequence occurs. There is also a general need for a method that can accommodate variations in update rates and which can allow the rover itself to select the exact point in time for which suitable data is needed.

SUMMARY OF THE INVENTION

Accordingly, an apparatus includes a processor and a computer readable storage medium accessible to the processor and bearing instructions which when executed by the processor cause the processor to undertake logic that includes establishing an observation set of plural past pseudoranges and respective past times between first and second objects to establish past range/time pairs. The processor also establishes a lookahead set of plural predicted future range estimates between the first and second objects and respective future times, and using a curve fitting routine, the past range/time pairs and future range/time pairs are described at least in part by a mathematical model whose coefficients are produced by the curve fitting routine. The coefficients are output to a third object, which receives the same satellite position signals at its location as are received by the second object at its location, to enable the third object to correct errors in pseudorange measurements that are common to both the second object and the third object.

"Pseudorange" may refer to both "code" and "carrier" (or "phase") pseudoranges. Code pseudoranges are derived from explicit time-of-transmit embedded (coded) in the messages sent by the GNSS transmitter to the receiver, from which, using a known value of speed-of-light, propagation distance may be determined. Carrier pseudoranges, on the other hand, are derived the phase shift observed in the broadcast carrier wave as it propagates between the GNSS transmitter and the receiver, from which, using known values of carrier frequency or wavelength and speed-of-light, the propagation time or distance may be derived.

In some examples, a latest time in the set of past pseudoranges is prior to an earliest time in the set of predicted future ranges such that the set of past pseudoranges is temporally separated from the set of predicted future ranges by a separation period. In example embodiments, ranges in the past range/time pairs described by the model are measured ranges, and the instructions when executed by the processor cause the processor to output, with the coefficients, a set of residual values each representing a respective difference between a measured range at an associated time and an evaluated range at the associated time of the measured range, the evaluated range being a range output by evaluation of the model represented by the coefficients. The curve fitting routine may implement a polynomial regression model that does not require a model response to pass through measurement range/time pairs. In an example implementation, the second object is fixed at a reference location, the first object is an orbiting satellite transmitting the satellite position signals, and the third object is mobile.

In another aspect, an apparatus includes a processor and a computer readable storage medium accessible to the processor and bearing instructions which when executed by the processor cause the processor to, using a history of plural past distances between two objects and a predictable history of plural future distances between the objects, generate a model of the past distances and future distances. The processor outputs the coefficients, but not the distances from which they were derived, to a receiver, wherein the distances can be reconstructed from the coefficients.

In another aspect, a method includes establishing a set of measured past relationships between first and second objects and establishing a set of estimated future relationships between the first and second objects. The method includes, using the past and future relationships, deriving a numerical model describing the past and future relationships and sending an output of the numerical model to a third object for application thereby to correct a value in the third object.

In another aspect, a method is disclosed by which a mathematical model is derived from a time history of past and present values of a distance between two objects combined with a time history of estimates of future values of the distance between said two objects. The method includes recording a plurality of measurements of distances between the two objects and times at which the distances occur and storing the measurements and measurement times in a memory device. The method also includes creating a plurality of estimates of future distances between the two objects and times at which the estimates are expected to occur, and storing the estimates and times in a memory device. A mathematical model is fit to the plurality of measurements of distances and the plurality of estimates of future distances, together treated as a single composite time history of distance between the two objects without regard for whether individual distances are measured or estimated.

In example embodiments of this last aspect, a first one of the two objects is designated as a transmitting device, and a second one of the two objects is designated as a receiving device. The measurements of distances between the transmitting device and the receiving device, and the times at which the measurements occur, are derived from one or more signals transmitted from the transmitting device to the receiving device. The transmitting device may also function as a receiving device, and the receiving device may also function as a transmitting device such that at least two signals are mutually exchanged, at least one from each of the transmitting device and the receiving device to the other.

In examples of this latter aspect the transmitting device is a Global Navigation Satellite and the receiving device is a Global Navigation Satellite System receiver, and the signals are Global Navigation Satellite System modulated radio frequency signals. If desired, the receiving device can be at a fixed and precisely-known location on or near the surface of the earth, or the receiving device can be stationary at an unknown location, or the receiving device can be mobile. The transmitting device may be a Global Navigation Satellite, the receiving device may be a Global Navigation Satellite System receiver, the signals may be Global Navigation Satellite System modulated radio frequency signals, and the estimates of future distances between the two objects and times at which they are expected to occur are derived from one or more of the following. They may be derived from ephemeris data associated with the Global Navigation Satellite, regularly broadcast by each Global Navigation Satellite, or precise orbital parameters associated with the Global Navigation Satellite, obtained from alternate sources.

In further non-limiting examples of this latter aspect, either or both of the transmitting device and the receiving device can be an orbiting satellite. The estimates of future distances between the transmitting device and the receiving device, and times at which they are expected to occur, can be derived from the known nominal orbital parameters of said satellite(s). Or, the estimates of future distances between the transmitting device and the receiving device, and times at which they are expected to occur, can be derived from similar orbital tracks found in historical data and used in pattern-matching. Yet again, the estimates of future distances between the transmitting device and the receiving device, and times at which they are expected to occur, can be derived by repeating past data, suitably aligned with the known orbital period(s).

Furthermore, the estimates of future distances between the two objects and times at which they are expected to occur may be derived from knowledge of the kinematics of one or both of the objects, or knowledge of periodicities in the motion of one or both of the objects, or knowledge of symmetries in the motion of one or both of the objects, or knowledge of trends in the motion of one or both of the objects, or knowledge of constraints upon the motion or position of one or both of the objects, or in which the estimates of future distances between the two objects are assigned constant values at any times because both objects are known to be at fixed locations.

In some implementations, a subset of contiguous distance and time measurements, designated a "window" of measurements and measurement times, is utilized. And/or, a subset of contiguous distance and time estimates, designated a "window" of estimates and expected times, can be utilized. The windows can "slide" over the measurements and/or estimates, one at a time, such that as time advances and newer measurements or estimates are incorporated, nominally the same number of measurements and/or estimates are spanned by the windows. Or, the windows can "hop" over the measurements and/or estimates, several at a time, such that as time advances and newer measurements or estimates are incorporated, nominally the same number of measurements and/or estimates are spanned by the windows. A temporal gap may exist between a latest measured time and an earliest future expected time for the distances between the objects.

In non-limiting examples the model can be configured as a polynomial or ratio of polynomials, or a spline, or Fourier coefficients, or spherical harmonic coefficients, or any other parametric mathematical model. The model may be derived by means including, but not limited to, least squares fit, or trigonometric methods, or Fourier analysis, or minimax methods, or spherical harmonic analysis, or linear predictor. The model can be subsequently evaluated in order to estimate distance values at times at which distance measurements exist, but the distance measurements are corrupted by errors, wherein the model is used to reduce the errors, with the reduction of errors being improved by the inclusion of the estimates of future distances in the formulation of the model. Or, arbitrary times in-between distance measurements can be used and the model used to interpolate between the measurements, with the interpolation being improved by the inclusion of the estimates of future distances in the formulation of the model. Or when times at which distance estimates exist, but accuracy of the distance estimates is suspect, the model can be used to improve accuracy of the estimates. Yet again, arbitrary times in-between distance estimates can be used to interpolate between the estimates, or arbitrary times within a gap between the distance measurements and the distance estimates can be used to extrapolate the distance measurements forward in time, with the extrapolation being improved by the inclusion of the estimates of future distances in the formulation of the model. The model is well-behaved in one example because it is interpolating between measured data and estimated data instead of only extrapolating measured data.

In another aspect, a method by which data compression may be achieved includes recording a plurality of measurements of a quantity and times at which said measurements occur and storing said measurements and measurement times in a memory device. The method includes creating a plurality of estimates of future values of the quantity and times at which the estimates are expected to occur and storing the estimates and times in a memory device. Also, the method can include fitting a mathematical model to the measurements and estimates, together treated as a single composite time history of the quantity without regard for whether individual quantity values are measured or estimated. In situations requiring only an approximation of the measured data the method can include storing, transmitting, or otherwise utilizing coefficients or parameters of the mathematical model instead of the measured data such that a representation of the measured data may be derived by means of an evaluation of the mathematical model at the associated measurement times. The representation is improved by the inclusion of the estimates of future values in the formulation of the model, or in at least one situation requiring an interpolation or an extrapolation of the measured data, storing, transmitting, or otherwise utilizing coefficients or parameters of the mathematical model such that a representation of the measured data may be derived by an evaluation of the model at arbitrary measurement times, with the representation being improved by the inclusion of the estimates of future values in the formulation of the model. Yet again, in a situation requiring an exact representation of the measurements a mathematical model is derived relative to any appropriate time in the past or present and used to form residual values, each of which represents a difference between a measured value and a result of an evaluation of the model at an associated measurement time. The coefficients, updated at an appropriate rate, are stored, transmitted, or otherwise used along with each residual value at an appropriate rate such that a result of an evaluation of the mathematical model represented by the coefficients or parameters at a measurement time, added to the residual value, forms a lossless representation of an associated measurement.

In another aspect, a method is disclosed by which derivatives of a time history of a quantity may be estimated and extrapolated. The method includes recording a plurality of measurements of a quantity and times at which the measurements occur and storing the measurements and measurement times in a memory device. The method also includes creating a plurality of estimates of future values of the quantity and times at which they are expected to occur and storing the estimates and times in a memory device, and then fitting a model to the measurements and estimates, together treated as a single composite time history of the quantity without regard for whether individual quantity values are measured or estimated. The method may further include estimation of derivatives of the quantity with respect to time by differentiating the model polynomial with respect to time, up to any desired order of the derivative, and evaluating the differentiated polynomial at any specific time of interest.

In an exemplary implementation of the latter two aspects above, data compression can be achieved by using a single model to create data elements in a single message. By virtue of the abilities of present principles to represent the pseudo-range measurements and to compute derivatives of the pseudorange time histories, at any desired instant in time, a single message created by present principles can replace multiple Radio Technical Commission For Maritime Services (RTCM) messages used heretofore. Furthermore, by virtue of present principles to compress data, this can be accomplished with a message that is smaller than the ensemble of RTCM messages heretofore required to convey similar information. Thus, instead of periodically broadcasting multiple sets of RTCM messages, only the model coefficients (and, optionally, the residual differences between the measured and modeled range values) need be broadcast, from which the receiver may reconstruct the information contained in the specific message types that it requires.

In another aspect, a method is disclosed by which a data model may be constructed such that said model can predict future configurations of itself. The method includes recording a plurality of measurements of a quantity and times at which the measurements occur and storing the measurements and measurement times in a memory device. The method also includes creating a plurality of estimates of future values of the quantity and times at which the estimates are expected to occur and storing the estimates and times in a memory device, and fitting a model to the measurements and estimates, together treated as a single composite time history of the quantity without regard for whether individual quantity values are measured or estimated. The method then includes configuring the model as a State Model, in which some combination of coefficients of the model is a representation of a slope of another coefficient in the model at a specific time of interest, and thus a set of all coefficients is a representation of a state of the model. In the preferred aspect, the model is configured as a regression polynomial, and each coefficient of the polynomial is representative of the slope of another coefficient of the model.

The state of the model at a current time can be used to estimate the state of the model at a future time by integrating a set of State Equations. The estimates of future state are improved by the inclusion of the estimates of future values in the formulation of the model. In the preferred aspect, integration of State Equations may incorporate an estimate of the slope of the coefficient associated with a highest-order term of the model polynomial, at the current time. The estimate of the slope of the highest-order polynomial coefficient may be determined by means including, but not limited to, evaluation of past values of the highest-order polynomial coefficient, by means of trend line analysis, or polynomial modeling, or trigonometric modeling, or the like.

Note that in this last aspect, data compression may be achieved by storing, transmitting, or otherwise utilizing the estimate of the slope of the highest-order polynomial coefficient, and incorporating the slope estimate in subsequent integration of the State Equations to update the entire set of model coefficients, instead of storing, transmitting, or otherwise utilizing the entire set of model coefficients. Thus, instead of periodically broadcasting the entire set of model coefficients, the data is compressed even further by broadcasting only the estimated slope of the highest-order model coefficient, and allow the receiver to integrate the State Equations itself.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

In brief overview, device built in accordance with present principles is capable of determining or receiving a plurality of measured pseudorange values between an orbiting GNSS satellite and a receiving device at a fixed location on Earth, and associated time values, and of storing the pseudorange and associated time values in a suitable memory device. The preferred embodiment device is further capable of determining or receiving a plurality of estimated range values between the aforementioned GNSS satellite and receiving device at future time values, using ephemeris data broadcast by said GNSS satellite or similar orbital parameters obtained from other sources, and mathematically projected into the future, and of storing the estimated range and associated time values in a suitable memory device. The preferred embodiment device is further capable of computing polynomial regression models describing time histories of ranges between the aforementioned GNSS satellite and receiving device, using combinations of the aforementioned stored measured pseudorange data and stored estimated future range data. The polynomial models advantageously smooth data, leading to a reduction of measurement errors, and interpolate in-between measurement points. Furthermore, by including estimated future range data into the computations used to create models, the models can also extrapolate into the future with far greater accuracy and numerical stability than has heretofore been achieved.

The preferred embodiment device can also effect data compression by replacing the time histories of range with the coefficients of the polynomial regression models derived from them, optionally accompanied by the modeling residuals, which are sent to a roving device instead of the underlying raw data. Using the polynomial regression models and residuals a representation of the time histories of range can be constructed as needed. Future values of the coefficients of the polynomial regression models can be computed by means of simple assumptions applied to the mathematical integration of the current coefficients of the polynomial regression models. Thus, the preferred embodiment device, by means of polynomial regression models, is capable of reducing errors in measurements of pseudorange between a GNSS satellite and receiving station for observations in the past and present, is capable of effective data compression by replacing a large number of pseudorange measurements with a small number of coefficients of a polynomial, optionally combined with modeling residuals, is capable of providing usefully accurate estimates of future ranges between the GNSS satellite and receiving station, and is capable of providing usefully accurate estimates of future coefficient values in the polynomial regression models.

Figure 1:
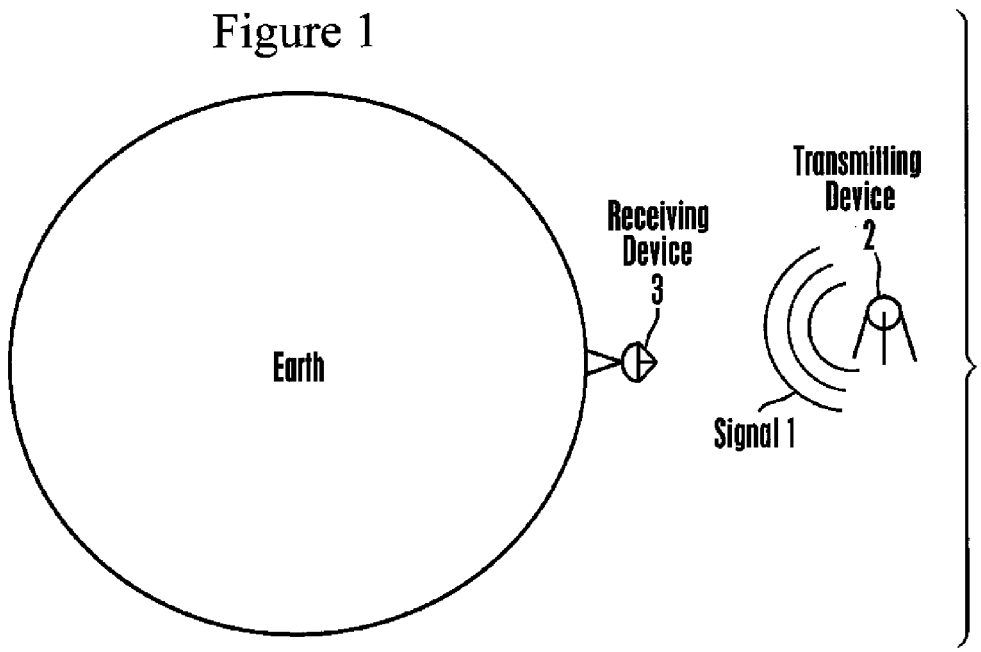
FIG. 1 is a schematic diagram showing the relative positions of the Transmitting Device (in orbit) and the Receiving Device (on Earth), and the signal that passes between them.
Figure 2:
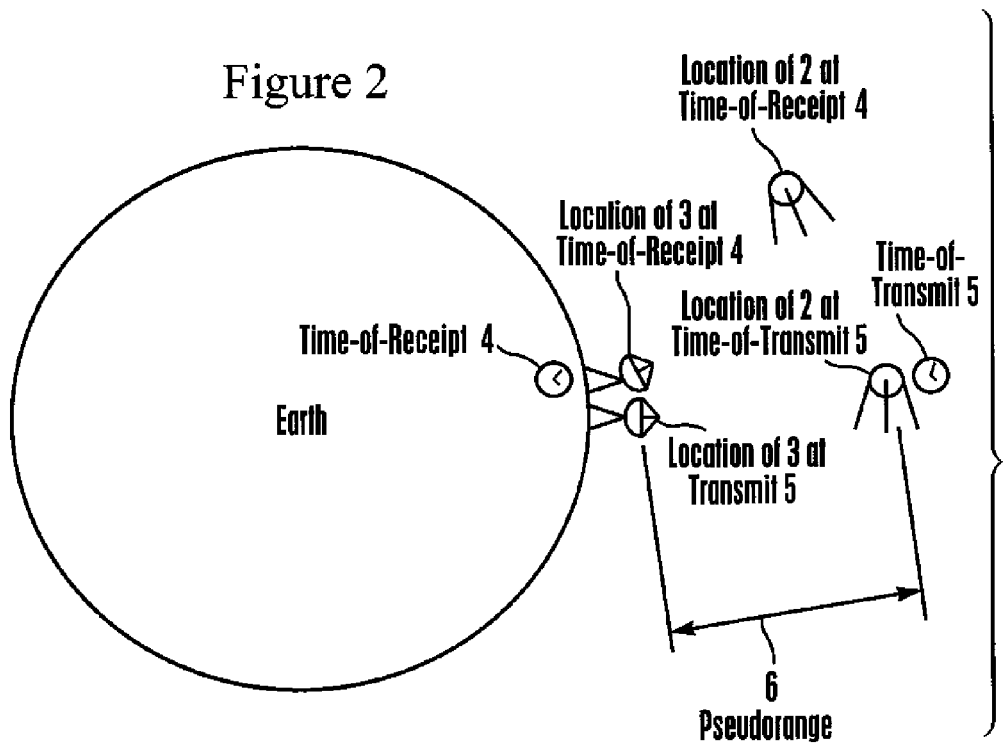
FIG. 2 is a schematic diagram showing how both the Transmitting Device and the Receiving Device move during the time required for the signal to propagate between them, and the configuration of the resultant pseudorange measurement.

Referring initially to FIG. 1, a position signal 1 is transmitted by a Transmitting Device 2 such as a navigational satellite and received by a Receiving Device 3. As indicated in FIG. 2, both the Transmitting Device 2 and Receiving Device 3 move during the time required for the Signal 1 to propagate between them, and this movement must be mathematically compensated based upon knowledge of the motions of Transmitting Device 2, Receiving Device 3, and the propagation velocity of Signal 1. The Signal 1 may thus be any signal from which the distance between Transmitting Device 2 and Receiving Device 3 may be ascertained because the propagation velocity is known or measured, precise Time-of-Receipt 4 is measured by Receiving Device 3, and (a) precise Time-of-Transmit 5 is embedded in Signal 1; or (b) precise Time-of-Transmit 5 is known because it follows a schedule; or (c) precise Time-of-Transmit 5 is conveyed to Receiving Device 3 by means of some ancillary signal or by other means, or because the propagation velocity and carrier frequency are known or measured, and carrier phase shift between the Transmitting Device 2 and the Receiving Device 3 is measured or otherwise determined.

In one preferred embodiment, Signal 1 is a Global Navigation Satellite System (GNSS) modulated radio frequency (RF) signal, as broadcast from GPS, GLONASS, GALILEO, QZSS satellites, or the like; Transmitting Device 2 is a GNSS satellite; and Receiving Device 3 is a GNSS receiver in a GNSS reference station, at a fixed and precisely-measured location on the surface of the earth. However, persons skilled in the art will recognize that nothing limits the implementation to the preferred embodiment. The Signal 1 may be any signal with predictable or measurable propagation characteristics, including but not limited to electromagnetic (EM) signals such as radio, television, RADAR, and LIDAR, and acoustic signals such as SONAR; the Transmitting Device 2 can be any device capable of transmitting Signal 1, and might be mobile as in the preferred embodiment, or fixed; the Receiving Device 3 can be any device capable of receiving Signal 1, and might be fixed as in the preferred embodiment, or mobile. Furthermore, both of the Devices 2 and 3 can serve dual functions as transmitters and receivers, resulting in two independent Signals 1 that are mutually exchanged, as in, for example, the satellites used in the Gravity Recovery And Climate Experiment (GRACE) project, or in vehicles such as automobiles, trucks, motorcycles, ships, or aircraft, as part of a vehicle-to-vehicle (V2V) collision-avoidance system or similar application.

The Pseudorange 6 is computed in Receiving Device 3, or in ancillary computational equipment such as a general purpose computer or other suitable device as described further below in reference to FIG. 9, using the Signal 1 and the associated Time-of-Transmit 5 and Time-of-Receipt 4 of the signal, and other information such as knowledge of the rate of rotation of Earth, by means known in the art. The Pseudorange 6 is almost always corrupted by various errors, some random and some deterministic. In the GNSS preferred embodiment, for example, each calculated value of Pseudorange 6 may be corrupted by measurement errors due to imprecise knowledge of time (on the transmit and receive ends both), perturbations in the speed-of-light through the ionosphere, troposphere, or other layers of the atmosphere, multipath, and others.

Figure 3:
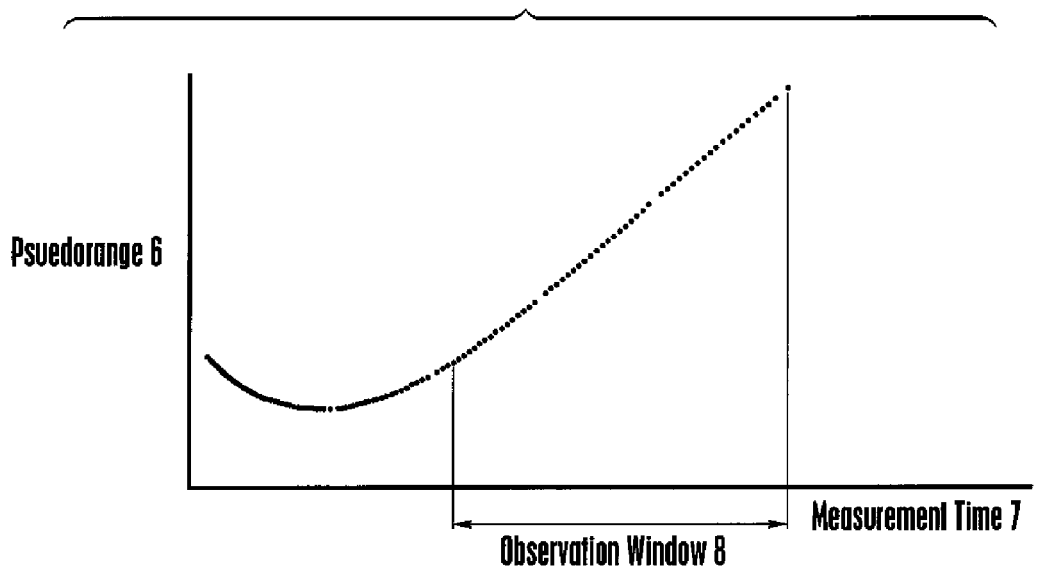
FIG. 3 is a schematic diagram showing how the Observation Window spans a subset of the available pseudorange measurements.

As shown in FIG. 3, a plurality of such measurements of Pseudorange 6 values and the associated times at which they occurred, designated Measurement Times 7 and derived by appropriate means from Time-of-Receipt 4 and Time-of-Transmit 5, can be recorded over a span of time designated Observation Window 8, as indicated in FIG. 3, and stored in a suitable memory device such as computer memory, hard drive, or similar. As time passes, the Observation Window 8 "slides" over the Pseudorange 6 measurements such that each Observation Window 8 nominally spans the same number of measurements, and as each new measurement is added to one end of the Observation Window 8, the corresponding oldest measurement is removed from the other end. Thus there is a very large overlap between each Observation Window 8 and many of its predecessors. The duration of Observation Window 8, the number of measurements contained therein, the time between measurements, the need (or lack thereof) for constant time between measurements, and similar parameters, are set as appropriate for the particular mathematical model in use. In one preferred embodiment, the Observation Window 8 spans approximately 3 to 4 minutes' data, nominal time between measurements ranges from 1 to 15 seconds, depending upon availability, time between measurements may vary, and the "newest" measurement contained within the Observation Window 8 corresponds to the "current" time. In addition, depending upon specific goals and needs, the Observation Window 8 may be made to "hop" instead of "slide", which simply means that the models corresponding to some temporal positions of the Observation Window 8 may be ignored and are therefore not computed.

Figure 4:
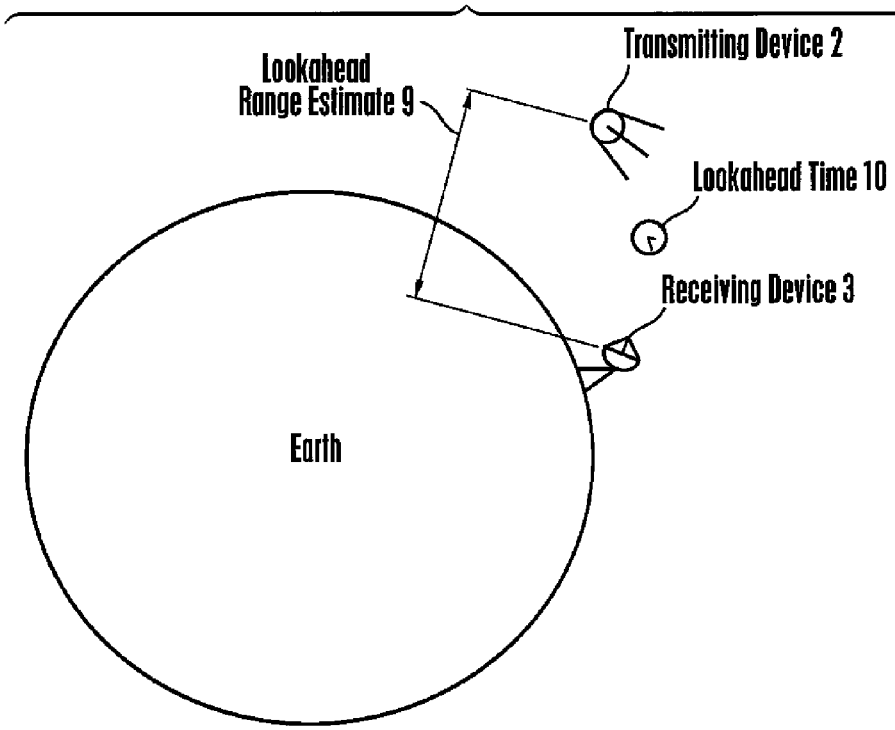
FIG. 4 is a schematic diagram showing the relative positions of the Transmitting Device (in orbit) and the Receiving Device (on Earth) at a future moment in time, and the configuration of the resultant Lookahead Range Estimate.
Figure 5:
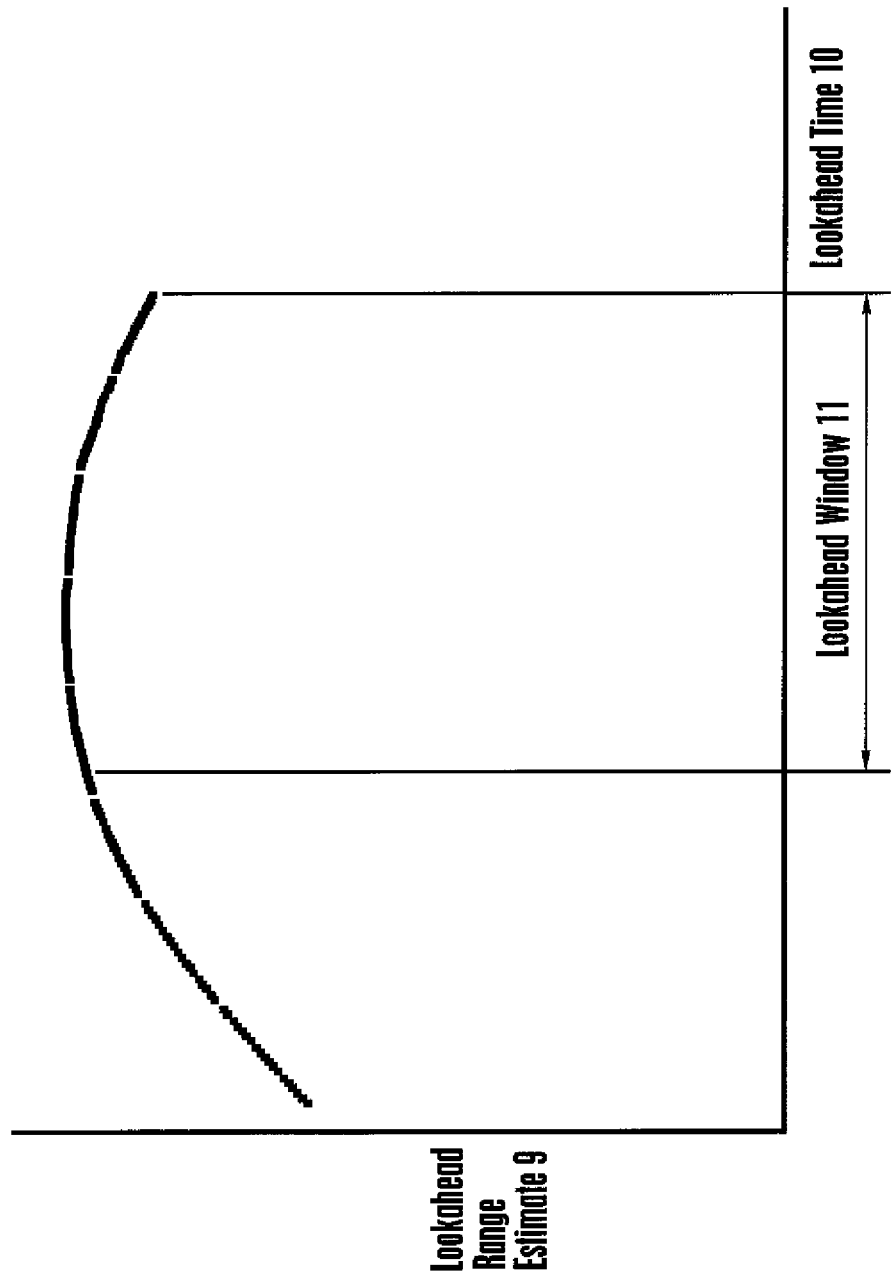
FIG. 5 is a schematic diagram showing how the Lookahead Window spans a subset of the available Lookahead Range Estimates.

According to novel present principles and now referring to FIG. 4, a plurality of estimated future values of the distance between the Transmitting Device 2 and the Receiving Device 3 are used and are designated as Lookahead Range Estimates 9, as well as their associated expected times-of-occurrence, designated Lookahead Times 10. These estimates are computed over a span of time designated as Lookahead Window 11, shown in FIG. 5. The duration of Lookahead Window 11, the number of range estimates contained therein, the temporal spacing between the estimates, and similar estimation parameters, are set as appropriate for the particular mathematical model in use. In one preferred embodiment, Lookahead Window 11 spans approximately 3 to 4 minutes' data, with the interval between estimates set to the same value as the interval between measurements in the associated Observation Window 8. As time passes, the Lookahead Window 11 "slides" or "hops" over Lookahead Range Estimates 9 in a manner similar, though not necessarily identical, to the manner in which Observation Window 8 "slides" or "hops" over the Pseudoranges 6.

A new model may be computed at each new position of Observation Window 8/Lookahead Window 11, as they slide or hop over the data.

In the preferred embodiment, Lookahead Range Estimates 9 are derived, using conventional computational equipment such as general purpose computers or other suitable devices, from ephemeris data obtained from the signals regularly broadcast by each GNSS satellite or from orbital parameters available from other sources. The ephemerides or orbital parameters contain sufficient information to predict a satellite's estimated position in an Earth-referenced coordinate system many hours into the future, and satellite position estimates obtained in this manner, combined with the Receiving Device 3's knowledge of its own position on Earth, and knowledge of Earth's rotation rate, are sufficient to compute any desired number of Lookahead Range Estimates 9 at any desired Lookahead Times 10 up to several hours in the future.

Persons skilled in the art will recognize that many other methods by which Lookahead Range Estimates 9 can be determined exist, including but not limited to, in the case where one or both of Transmitting Device 2 and Receiving Device 3 are orbiting satellites: use of historical data to find similar orbital tracks for use in pattern-matching; repeating past data, suitably aligned with the known orbital period(s); or basic numerical techniques for extrapolation, curve-fitting, or the like; along with the known rotation rate of the Earth, if necessary, to compute estimates of relative positions and/or distances. In cases not necessarily involving orbiting satellites, any knowledge of the kinematics of the system and its constituents, or of periodicities, symmetries, or similar trends in the system dynamics, that can be used to estimate future positions of Transmitting Device 2 and/or of Receiving Device 3 can be used to estimate the future relative distances between them.

Figure 6:
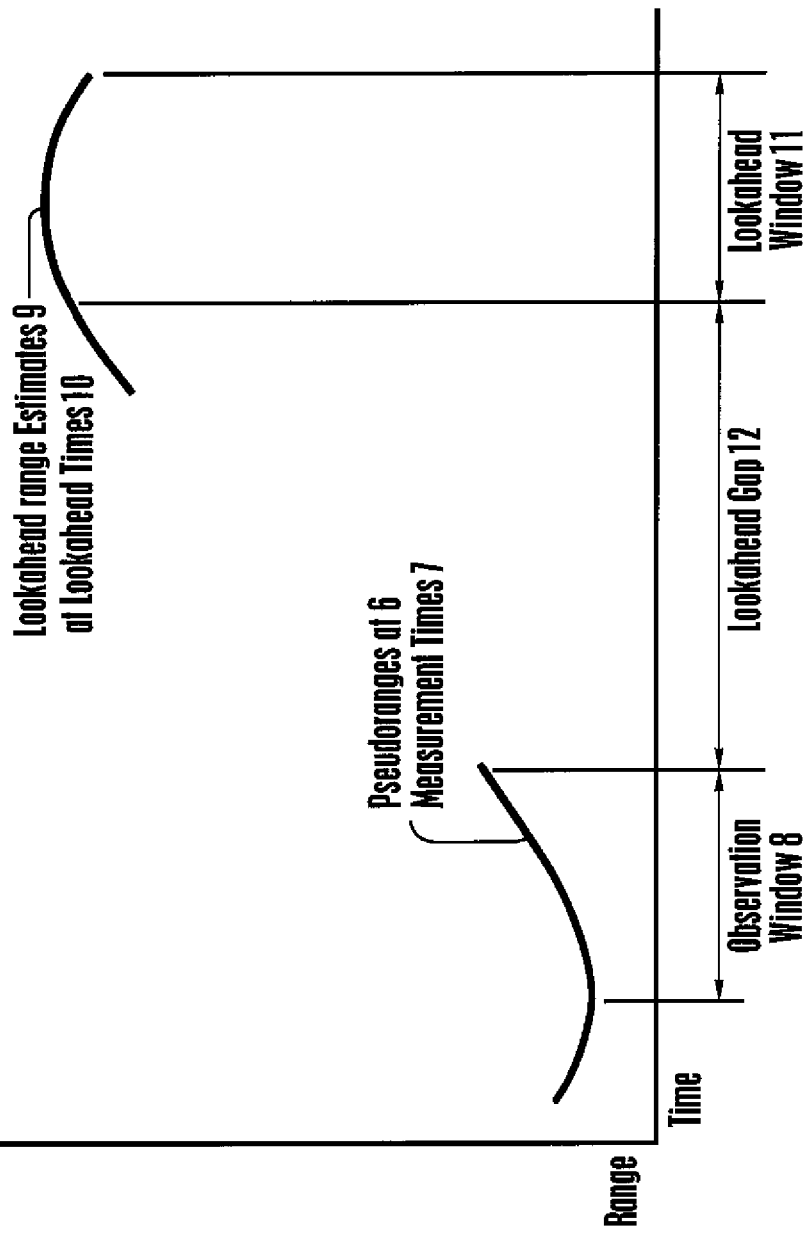
FIGS. 6 and 7 are schematic diagrams showing the relative temporal positions of the Observation Window, Lookahead Gap, Lookahead Window, and Range vs Time Pairs.

The Observation Window 8 and Lookahead Window 11 are oriented in time as indicated in FIG. 6. As shown, it is not necessary that Lookahead Window 11 be temporally adjacent to Observation Window 8; in fact significant benefit can be derived from the presence of a temporal gap between them, designated Lookahead Gap 12 in FIG. 6. In one preferred embodiment, Lookahead Gap 12 is set to approximately 30 minutes.

Figure 7:
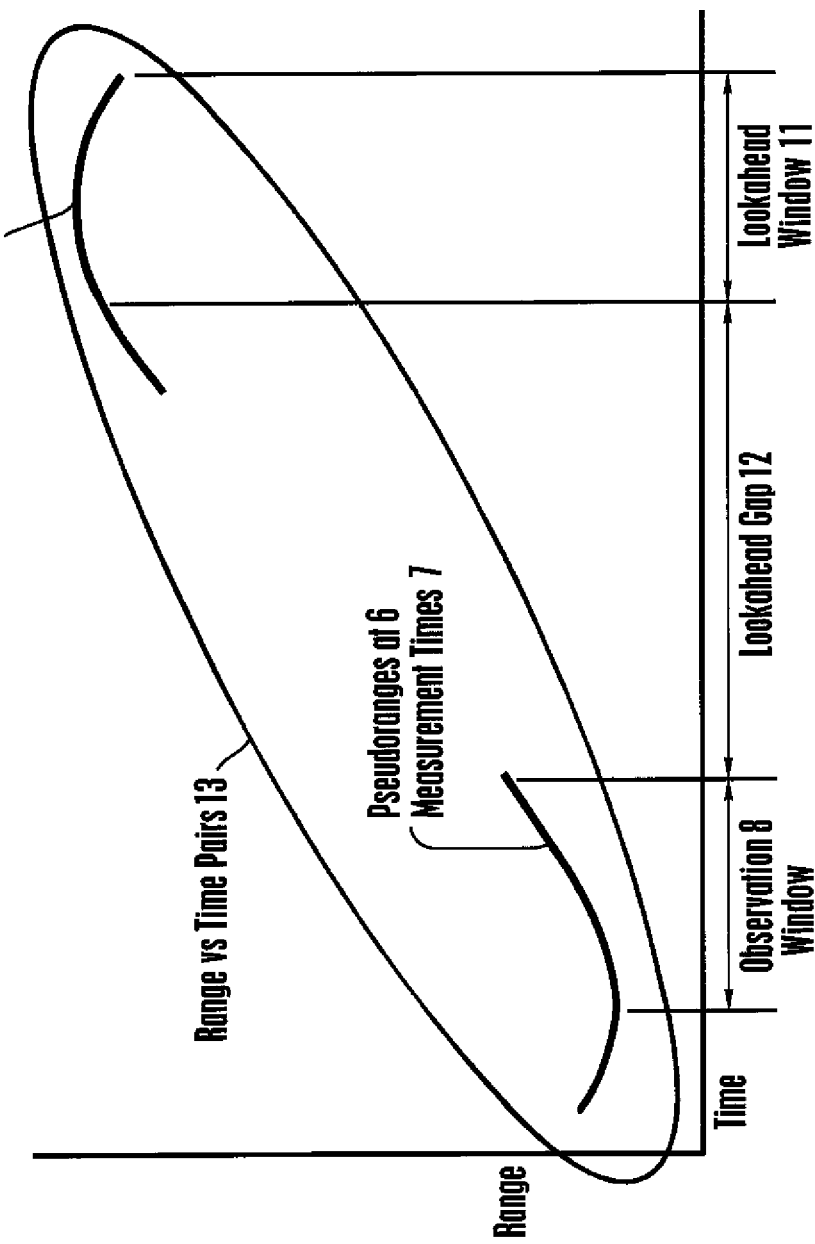

The measured Pseudorange 6 values and their associated Measurement Times 7 (spanned by Observation Window 8), together with the estimated Lookahead Range Estimates 9 and their associated Lookahead Times 10 (spanned by Lookahead Window 11), form a set of "range vs time" value pairs, designated Range vs Time Pairs 13 in FIG. 7, from which a numerical model is derived. The fact that some of the range values are measured and others are estimated does not affect the model. Example models that may be used include polynomial and trigonometric models, a spline fit, a Fourier series fit, and a minimax fit. Persons skilled in the art will recognize that many other types of models can be formulated from these same data, including but not limited to models based upon spherical harmonics, linear predictors, and the like.

One preferred embodiment uses polynomial regression models formulated as follows:

Each individual Range vs Time pair 13 element is assumed to be described by a polynomial of the form in equation 1:

$$\text{Range}(t) = C_n \left(\frac{(t-t_0)}{t_n}\right)^n + C_{n-1}\left(\frac{(t-t_0)}{t_n}\right)^{n-1} + \ldots + C_2\left(\frac{(t-t_0)}{t_n}\right)^2 + C_1\left(\frac{(t-t_0)}{t_n}\right) + C_0 \quad (\text{eq. 1})$$

where

Range(t) is the measured or estimated Range (Pseudorange 6 or Lookahead Range Estimate 9, respectively) uniquely associated with time t;

t is the time (Measurement Time 7 or Lookahead Time 10, as appropriate) uniquely associated with Range (t);

$t_0$ and $t_n$ are optional "scaling" parameters used to reduce numerical overflow and underflow problems in the computation of the models, determined empirically, e.g., using principles outlined for other purposes in Michaelsen Online Course Notes for *Geography 210B, Environmental Data Analysis, Winter* 2007, *Lecture* 18: "Polynomial Regression Models in one Variable", http://www/geog/ucsb.edu/~joel/g210_w07/lecture_notes/lect18/oh07_18_1.html: "numerical overflow and underflow problems can be reduced by scaling", incorporated herein by reference;

$C_n \ldots C_0$ are the coefficients of the polynomial regression model;

n is the model order, determined empirically;

n, n-1, . . . are exponents in the polynomial regression model.

After each pair element of Range vs Time pair 13 is entered separately into equation 1, the result is a set of simultaneous equations, expressed in matrix form in equation 2:

$$\begin{bmatrix} \text{Pseudorange}(t-m) \\ \text{Pseudorange}(t-m+1) \\ \text{Pseudorange}(t-m+2) \\ \vdots \\ \text{Pseudorange}(t) \\ \text{LookaheadRange}(t+g) \\ \text{LookaheadRange}(t+g+1) \\ \text{LookaheadRange}(t+g+2) \\ \vdots \\ \text{LookaheadRange}(t+g+m) \end{bmatrix} = \begin{bmatrix} \left(\frac{t-t_0-m}{t_n}\right)^n & \left(\frac{t-t_0-m}{t_n}\right)^{n-1} & \cdots & \left(\frac{t-t_0-m}{t_n}\right)^2 & \left(\frac{t-t_0-m}{t_n}\right) & 1 \\ \left(\frac{t-t_0-m+1}{t_n}\right)^n & \left(\frac{t-t_0-m+1}{t_n}\right)^{n-1} & \cdots & \left(\frac{t-t_0-m+1}{t_n}\right)^2 & \left(\frac{t-t_0-m+1}{t_n}\right) & 1 \\ \left(\frac{t-t_0-m+2}{t_n}\right)^n & \left(\frac{t-t_0-m+2}{t_n}\right)^{n-1} & \cdots & \left(\frac{t-t_0-m+2}{t_n}\right)^2 & \left(\frac{t-t_0-m+2}{t_n}\right) & 1 \\ \vdots & \vdots & & \vdots & \vdots & \vdots \\ \left(\frac{t-t_0}{t_n}\right)^n & \left(\frac{t-t_0}{t_n}\right)^{n-1} & \cdots & \left(\frac{t-t_0}{t_n}\right)^2 & \left(\frac{t-t_0}{t_n}\right) & 1 \\ \left(\frac{t-t_0+g}{t_n}\right)^n & \left(\frac{t-t_0+g}{t_n}\right)^{n-1} & \cdots & \left(\frac{t-t_0+g}{t_n}\right)^2 & \left(\frac{t-t_0+g}{t_n}\right) & 1 \\ \left(\frac{t-t_0+g+1}{t_n}\right)^n & \left(\frac{t-t_0+g+1}{t_n}\right)^{n-1} & \cdots & \left(\frac{t-t_0+g+1}{t_n}\right)^2 & \left(\frac{t-t_0+g+1}{t_n}\right) & 1 \\ \left(\frac{t-t_0+g+2}{t_n}\right)^n & \left(\frac{t-t_0+g+2}{t_n}\right)^{n-1} & \cdots & \left(\frac{t-t_0+g+2}{t_n}\right)^2 & \left(\frac{t-t_0+g+2}{t_n}\right) & 1 \\ \vdots & \vdots & & \vdots & \vdots & \vdots \\ \left(\frac{t-t_0+g+m}{t_n}\right)^n & \left(\frac{t-t_0+g+m}{t_n}\right)^{n-1} & \cdots & \left(\frac{t-t_0+g+m}{t_n}\right)^2 & \left(\frac{t-t_0+g+m}{t_n}\right) & 1 \end{bmatrix} \begin{bmatrix} C_n \\ C_{n-1} \\ \vdots \\ C_2 \\ C_1 \\ C_0 \end{bmatrix} \quad (\text{eq. 2})$$

where

Pseudorange (t−m) is the Pseudorange 6 range value associated with Measurement Time 7 "t−m";

Pseudorange (t−m+1) is the Pseudorange 6 range value associated with Measurement Time 7 "t−m+1", and so on;

LookaheadRange(t+g) is the Lookahead Range Estimate 9 value associated with Lookahead Time 10 "t+g";

LookaheadRange(t+g+1) is the Lookahead Range Estimate 9 value associated with Lookahead Time 10 "t+g+1", and so on;

g is the size of Lookahead Gap 12.

Equation 2 can be expressed in matrix shorthand as equation 3:

$$[R] = [T][C] \quad (\text{eq.3})$$

In the preferred embodiment there are many more equations than unknowns and thus matrix [T] represents the over-determined case and has full-rank. Therefore the optimal least-squares solution for the coefficient vector [C] may be determined using, e.g., principles outlines in Planetmath.org, online reference for *Pseudoinverse*, http://planetmath.org/encyclopedia/MoorePenrosePseudoinverse2.html, incorporated herein by reference as equation 4:

$$[T]^+[R] = [C] \quad (\text{eq.4})$$

where $[T]^+$ is the pseudoinverse of $[T]$ and $[C]$ is the set of polynomial coefficients that form a least-squares fit of the model to the data.

Persons skilled in the art will recognize that there are many mathematical methods available to compute the pseudoinverse of a matrix.

In one preferred embodiment a new polynomial model is derived after each advancement of the Observation Window 8 (and, in lockstep, the advancement of the Lookahead Window 11), which typically corresponds to the receipt of a new value of the Pseudorange 6 and its associated Measurement Time 7 value. Having derived the model, determination of a modeled value for its range variable is accomplished by evaluating the model polynomial according to polynomial evaluation principles known in the art, with its time variable set to a desired value.

Note that present principles can estimate the satellite range in between the times when measurements of those ranges exist. Moreover, contrary to prior teachings that such models diverge quickly and thus fail when used for interpolation near the endpoints of the measured data, or for extrapolation into the future, present principles understand that this predicted shortcoming can be avoided. Specifically, first observe that Range vs Time pair 13 consists of a set of measured value pairs spanning time from the past through the present (Pseudorange 6 and associated Measurement Times 7), a temporal gap in the value pairs (Lookahead Gap 12), and a set of estimated value pairs spanning a period of time in the future (Lookahead Ranges Estimated 9 and associated Lookahead Times 10). When present principles are used to model the data near the "newest" end of measurements in Observation Window 8, or to extrapolate to times in the future that fall within Lookahead Gap 12 or Lookahead Window 11 (beyond the end of the measured data), the models are well-behaved because they are stabilized by the presence of estimated future data, or because they are interpolating between measured data and estimated data, respectively. In the GNSS preferred embodiment the need for extrapolation beyond the end of the measured data seldom extends more than approximately 60 seconds into the future. Because the Lookahead Gap 12 in the preferred embodiment is on the order of 30 minutes in length, the net result is excellent extrapolation of the measured data over the desired extrapolation period owing to the use of reasonably accurate (since derived from predictable parameters) estimates of future data. The degree to which the interpolated range values will agree with actual future measured values of Pseudorange 6 is, of course, strongly related to the quality of the estimate used to create Lookahead Ranges Estimated 9.

In addition, the use of a model that does not force the model response to pass through the measurement points promotes error reduction by smoothing measurement errors.

Having derived the polynomial regression model as described above, data compression is achieved by replacing the raw measurement data with the coefficients of the model that describes them. For example, in the preferred embodiment Observation Window 8 might span 4 minutes, Lookahead Gap 12 might span 30 minutes, and Lookahead Window 11 might span 4 minutes. If the data that occupy Observation Window 8 are sampled at 1-second intervals, then Observation Window 8 contains 240 range values. The preferred embodiment polynomial order is 5, thus six polynomial coefficients replace 240 range values. However, the polynomial model does not only describe the data within Observation Window 8; it can also be used to describe extrapolated data within Lookahead Gap 12 (1800 samples), and, under appropriate circumstances, even within Lookahead Window 11 (240 samples). Thus, in the preferred embodiment six polynomial coefficients can potentially replace 2280 range samples.

In cases where a completely lossless representation of the range sample data is necessary, the model coefficients can be accompanied by a set of values representing the difference between the actual measurement at each measurement time and the model evaluated at that same time. Such residual values are herein referred to as "nonces". "Nonce" is a term from the cryptography field, where it describes a value created for use just one time. As the nonce values are typically very much smaller in magnitude than their associated measured range values, and can therefore be represented with fewer bits, data compression is achieved even in the lossless case. And, optionally, the nonce data can be updated at the measurement rate while the polynomial coefficients are updated at a slower rate, reducing the computational load and compressing the data even further by requiring the exchange of still fewer bits.

In cases where multiple Signals 1 are transmitted from Transmitting Device 2 to Receiving Device 3, further data compression can be achieved by modeling pseudoranges derived from one of the signals, and then computing nonces representing differences between evaluation of the model associated with that one signal and the raw pseudorange measurements associated with each of the other signals. In this case, the model coefficients can be accompanied by multiple nonces representing the non-modeled signals, in addition to each nonce representing the modeled signal, resulting in lossless representations of measurements derived from all of the signals. In one exemplary embodiment, the separate code and carrier signals from a single GNSS satellite can be modeled such that one signal is represented as the model of the other signal plus a set of nonce values.

Another useful characteristic of the preferred embodiment implementation as a polynomial model is the ability to estimate derivatives. In the GNSS field it is often necessary to estimate range-rate, for example in the computation of Doppler or Sagnac effects, in addition to range. Range-rate represents the rate of change of range with respect to time, and is trivially easy to extract from the preferred embodiment model by computing the first derivative of the model polynomial with respect to time by conventional means well-known in the art, and then evaluating that first derivative at the specific times of interest. Relative acceleration and other higher-order derivatives can, of course, be computed by repeated applications of the same process. In this respect present principles continue to compute the derivative(s) not only at past and present time points within the Observation Window 8, but also at future time points within the Lookahead Gap 12 and even within Lookahead Window 11.

Furthermore, it may now be appreciated that the derivatives at times near the end of the Observation Window 8 and within the Lookahead Gap 12 are well-behaved because of the stabilizing influence of the estimated data in the Lookahead Window 11.

Another useful characteristic of the preferred embodiment implementation as a polynomial model is that model's ability to predict future configurations of itself. This is a mathematical characteristic exposed by the particular manner in which the preferred embodiment model polynomial is formulated, and is explained below.

Returning to equation 1:

$$\text{Range}(t) = C_n\left(\frac{(t-t_0)}{t_n}\right)^n + C_{n-1}\left(\frac{(t-t_0)}{t_n}\right)^{n-1} + \ldots + C_2\left(\frac{(t-t_0)}{t_n}\right)^2 + C_1\left(\frac{(t-t_0)}{t_n}\right) + C_0 \quad \text{(repeat eq. 1)}$$

If empirical scaling constants $t_0$ and $t_n$ are ignored for the moment, then equation 1 takes the generic form shown in equation 5:

$$y(t) = C_n t^n + C_{n-1} t^{n-1} + \ldots + C_2 t^2 + C_1 t + C_0 \quad \text{(eq.5)}$$

If a change-of-origin is applied to equation 5, such that the origin is moved from (0,0) to (−Δt,0), then the resulting polynomial for the same equation, at the new origin, becomes as in equation 6:

$$y(t) = C_n(t+\Delta t)^t + C_{n-1}(t+\Delta t)^{n-1} + \ldots + C_2(t+\Delta t)^2 + C_1(t+\Delta t) + C_0 \quad \text{(eq.6)}$$

If a new polynomial, equation 7, is defined as:

$$y(t) = \overline{C}_n t^n + \overline{C}_{n-1} t^{n-1} + \ldots + \overline{C}_2 t^2 + \overline{C}_1 t + \overline{C}_0 \ldots \quad \text{(eq.7)}$$

and equation 7 is set equal to equation 6 as indicated in equation 8:

$$\overline{C}_n t^n + \overline{C}_{n-1} t^{n-1} + \ldots + \overline{C}_2 t^2 + \overline{C}_1 t + \overline{C}_0 = C_n(t+\Delta t)^t + C_{n-1}(t+\Delta t)^{n-1} + \ldots + C_2(t+\Delta t)^2 + C_1(t+\Delta t) + C_0 \ldots \quad \text{(eq.8)}$$

then expanding the binomial powers and combining like terms results in equation 9:

$\overline{C}_0 = $ (terms in higher powers of $\Delta t$) $+ C_1(\Delta t) + C_0$ $\overline{C}_1 = $ (terms in higher powers of $\Delta t$) $+ 2C_2(\Delta t) + C_1$ $\overline{C}_2 = $ (terms in higher powers of $\Delta t$) $+ 3C_3(\Delta t) + C_2$ $\ldots$ $\overline{C}_{n-1} = $ (terms in higher powers of $\Delta t$) $+ nC_n(\Delta t) + C_{n-1}$ $$\overline{C}_n = C_n \quad \text{(eq.9)}$$

Solving for the slopes of $C_0, C_1, \ldots, C_{n-1}$ with respect to $\Delta t$ requires computing the limit of the terms in equation 9 as $\Delta t$ approaches zero, in a conventional manner well-known in the art, resulting in the expressions in equation 10:

$$\text{slope}(C_0) = \lim_{\Delta t \to 0} \frac{\overline{C}_0 - C_0}{\Delta t} = \quad \text{(eq. 10)}$$

$$\frac{\text{(terms in higher powers of }\Delta t) + C_1(\Delta t) + C_0 - C_0}{\Delta t} = C_1$$

$$\text{slope}(C_1) = \lim_{\Delta t \to 0} \frac{\overline{C}_1 - C_1}{\Delta t} =$$

$$\frac{\text{((terms in higher powers of }\Delta t) + 2C_2(\Delta t) + C_1 - C_1)}{(\Delta t)} = 2C_2$$

$$\text{slope}(C_2) = \lim_{\Delta t \to 0} \frac{\overline{C}_2 - C_2}{\Delta t} =$$

$$\frac{\text{((terms in higher powers of }\Delta t) + 3C_3(\Delta t) + C_2 - C_2)}{(\Delta t)} = 3C_3$$

$$\vdots$$

$$\text{slope}(C_{n-1}) = \lim_{\Delta t \to 0} \frac{\overline{C}_{n-1} - C_{n-1}}{\Delta t} =$$

(terms in higher powers of $\Delta t$) +

$$\frac{nC_n(\Delta t) + C_{n-1} - C_{n-1}}{\Delta t} = nC_n$$

$$\text{slope}(C_n) = \lim_{\Delta t \to 0} \frac{\overline{C}_n - C_n}{\Delta t} = \frac{C_n - C_n}{\Delta t} = 0$$

The interpretation of these results is as follows: at any given point in time, C1 is a representation of the slope of C0, C2 is a representation of the slope of C1, C3 is a representation of the slope of C2, and so on. This means that the polynomials used in the preferred embodiment form a State Space description of the system represented by the preferred embodiment model.

It also means that the state of the model polynomial (the values of the coefficients in vector [C]) at any point in time can, after application of some simple assumptions, predict the future state of the system (future values of the coefficients in vector [C]) by integrating the State Equations shown in equation 11:

$$x(t) = \begin{bmatrix} C_0(t) \\ C_1(t) \\ C_2(t) \\ C_3(t) \\ \vdots \\ C_n(t) \end{bmatrix} \quad \text{(eq. 11)}$$

$$\dot{x}(t) = \begin{bmatrix} \dot{C}_0(t) \\ \dot{C}_1(t) \\ \dot{C}_2(t) \\ \dot{C}_3(t) \\ \vdots \\ \dot{C}_n(t) \end{bmatrix} = \begin{bmatrix} 1 \cdot C_1(t) \\ 2 \cdot C_2(t) \\ 3 \cdot C_3(t) \\ 4 \cdot C_4(t) \\ \vdots \\ \text{slope}(C_n(t)) \end{bmatrix} = \begin{bmatrix} 0 & 1 & 0 & 0 & \ldots & 0 \\ 0 & 0 & 2 & 0 & \ldots & 0 \\ 0 & 0 & 0 & 3 & \ldots & 0 \\ 0 & 0 & 0 & 0 & \ldots & 0 \\ \vdots & \vdots & \vdots & \vdots & \ddots & \vdots \\ 0 & 0 & 0 & 0 & \ldots & 0 \end{bmatrix}$$

$$\begin{bmatrix} C_0(t) \\ C_1(t) \\ C_2(t) \\ C_3(t) \\ \vdots \\ C_n(t) \end{bmatrix} + \begin{bmatrix} 0 \\ 0 \\ 0 \\ 0 \\ \vdots \\ \text{slope}(C_n(t)) \end{bmatrix} = A \cdot x(t) + B \cdot u(t)$$

Formulation and integration of the State Equations, above, may be effected by known means such as those described by Rowell, MIT Course Notes for *Analysis and Design of Feedback Control Systems*. "State-Space Representation of LTI Systems", web.mit.edu/2.14/www/Handouts/StateSpace.pdf incorporated herein by reference. Note that using equation (11), the rover can, from receiving a derivative or slope of the highest order coefficient, propagate the model forward in time. In other words, in some embodiments only the slope (derivative) of the highest order coefficient is sent from the reference station to the rover as a further form of data compression.

The only unknown in the equation 11 is slope($C_n(t)$) (the slope of the curve representing coefficient $C_n$), which means that slope($C_n(t)$) is the single driving-point for the entire system. If suitable estimates for the values of slope($C_n(t)$) are applied in equation 11 (instead of using "0" as implied by equation 10), then estimates for the future state of the entire rest of the system—all of the coefficients—will automatically follow trajectories that are entirely consistent and appropriate, and the preferred embodiment polynomial will have successfully predicted its own future.

Figure 8:
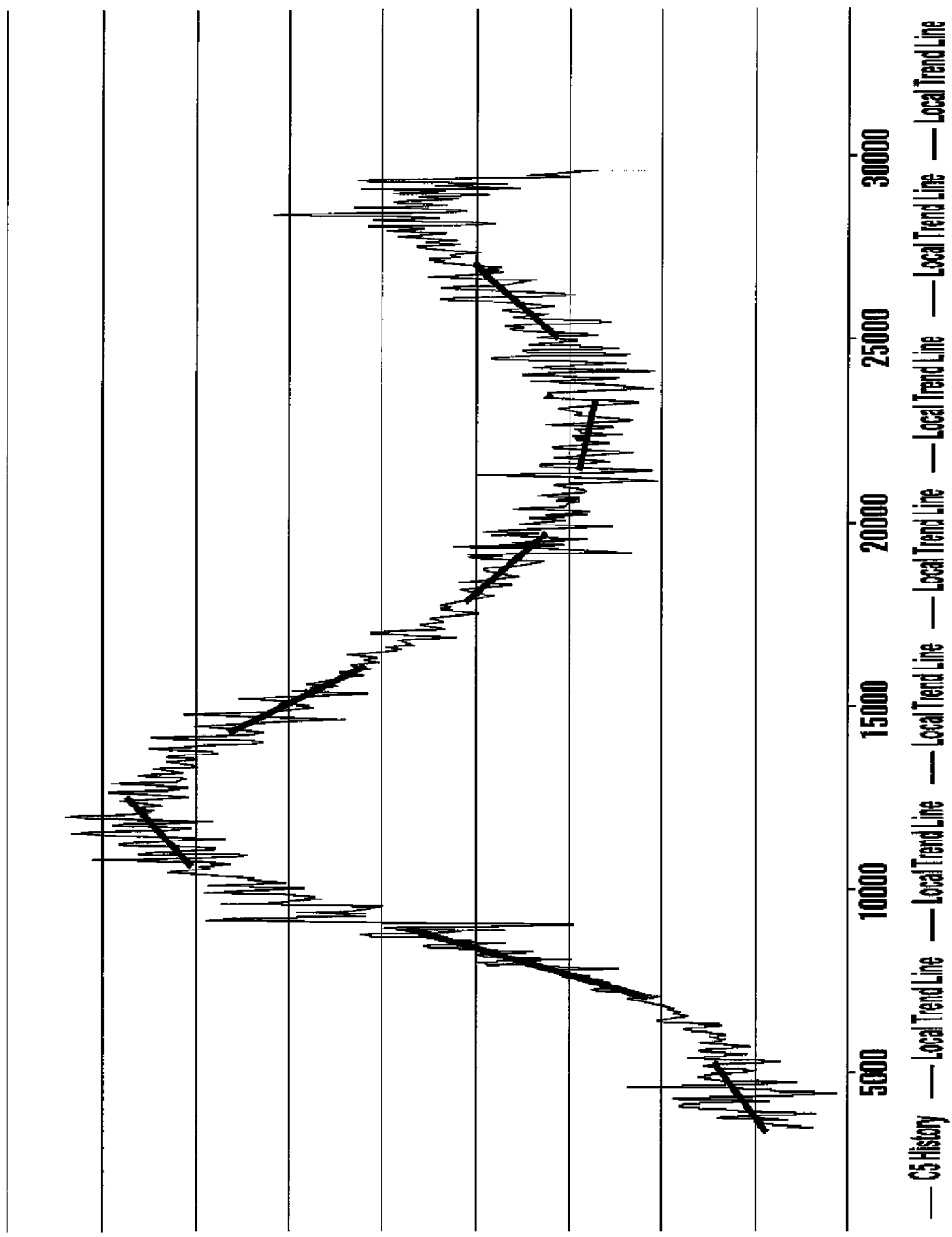
FIG. 8 is a graph showing an exemplary time history of a highest-order polynomial coefficient, and some local regression-line fits to that time history.

Persons skilled in the art will recognize that many suitable means to estimate slope($C_n(t)$) in equation 11 exist, including but not limited to observation of historical values of $C_n(t)$ and application of simple trend line analysis and subsequent extrapolation; polynomial or trigonometric modeling of historical values of $C_n(t)$ and subsequent extrapolation; and similar methods. FIG. 8 shows an exemplary situation, using actual measured data, in which the value of $C_5(t)$ ($C_n(t)$ in a $5^{th}$-order context) is plotted as a function of time. The regression line at various time points is superimposed upon the plot of $C_5(t)$. In this case each regression line is determined by trend line analysis of the current and most recent 1799 data points (one-half hour into the past). It is readily apparent from the slope of the regression lines that "zero" is seldom an appropriate value for slope($C_n(t)$).

Figure 9:
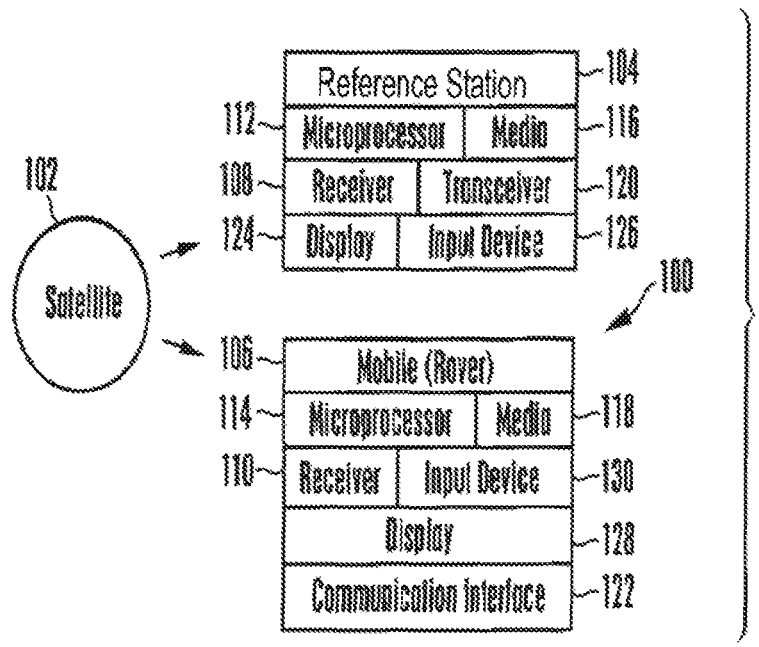
FIG. 9 is a block diagram of an example system according to present principles.

Now referring to FIG. 9, an example system 100 that can be used to implement principles above includes one or more navigation satellites 102 located in space above the Earth and one or more reference stations 104 that typically are immovably disposed at known, unchanging locations on the Earth. One or more mobile platforms, hereinafter rovers 106, are also included in the system 100. Both the reference station 104 and rover 106 receive position signals from the satellite 102 through respective satellite receivers 108, 110 sending signals to respective processors 112, 114 accessing instructions contained on one more respective computer readable storage media 116, 118 such as disk-based or solid state storage to execute logic according to present principles. As set forth above and explained further below, the reference station 104 extracts distance measurements from the signal it receives from the satellite 102 and sends, via a suitable transceiver 120, indications of those measurements to a communication interface 122 of the rover 106 so that the rover processor 114 can quantify errors in the measurements of distance between satellite 102 and reference station 104, and apply corrections for those errors its own position as determined from the signal from the satellite 102. In some embodiments the reference station 104 may be embodied as a computer that includes a display 124 controlled by the processor 112 and an input device assembly 126 such as keyboards, mice, etc. for sending user input to the processor 112. Likewise, the rover 106 may be embodied as a computer in, e.g., a mobile platform such as a telephone, a vehicle, etc. that includes a display 128 controlled by the processor 114 and an input device assembly 130 such as keyboards, mice, etc. for sending user input to the processor 114.

Figure 10:
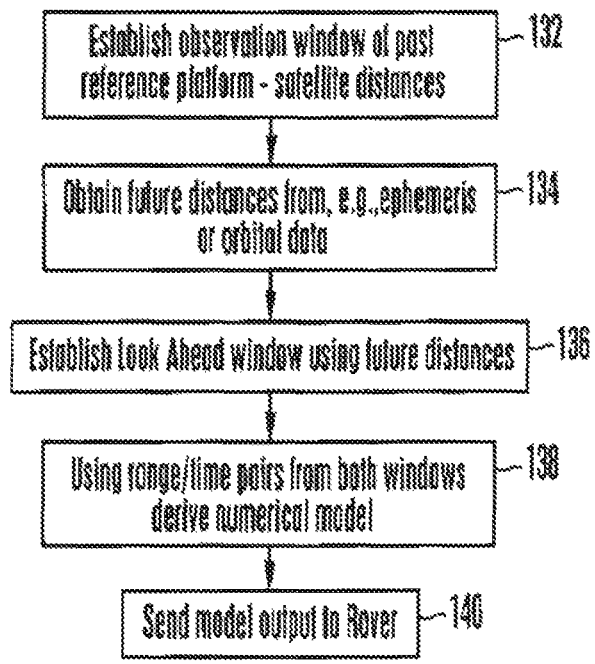
FIGS. 10-12 are flow charts of example logic according to present principles.

FIG. 10 illustrates principles discussed above in flow chart format to give a non-limiting example of computer program instructions that may be stored on a computer readable storage medium for execution by a processor, in this case, the processor 112 of the reference station 104. Commencing at block 132, the above-described observation window is established of past distances (also referred to as "ranges") along with the respective times at which the distances were attained between the reference station 104 and satellite 102. Moving to block 134, future estimated distances between the reference station 104 and satellite 102 with respective times are obtained by one or more of the exemplary methods described above (e.g., by ephemeris data, orbital data, etc.) and then at block 136 the Lookahead window is established using the future estimated distances and times from block 134. Using the range-time pairs from both windows, at block 138 a numerical model is derived for each pair. The model output, in the preferred example in the form of polynomial coefficients in some cases accompanied by nonces, is sent to the rover 106 at block 140. Or, after an initial complete set of coefficients has been sent to the rover 106, the slope (derivative) of the highest order polynomial coefficient may afterward be sent in lieu of the coefficients and then integrated at the rover to propagate the coefficients, compressing data even further.

Figure 11:
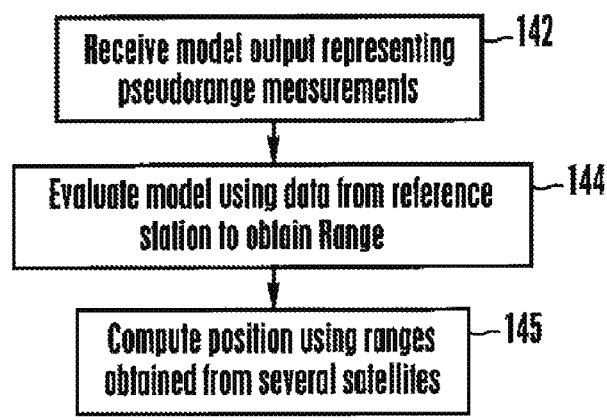

Example rover 106 logic is shown in FIG. 11, in which, at block 142, the rover 106 receives from the reference station 104 the model coefficients, which represent range information to be utilized at block 144 to correct pseudorange measurements between satellite 102 and rover 106. In the preferred embodiment the rover processor 114 has knowledge of the general model (e.g., $n^{th}$ order polynomial) used by the reference station and so can simply reverse the process undertaken by the reference station and evaluate the model represented by the coefficients received from the reference station to yield a representation of the measured distance between the satellite and the reference station. In block 145 the rover computes its position using the computed ranges from several satellites.

In greater detail with respect to block 144, by accounting for differences between signals received both at the reference station and at the remote rover, common-mode errors are effectively eliminated. This facilitates an accurate determination of the rover's coordinates relative to the reference station's coordinates. When the reference station's coordinates are kinematic (such as the case of nearby operating rovers/vehicles exchanging data), this further facilitates an accurate determination of position of each vehicle relative to the other.

Recall that in a differentially corrected system the precise position of the reference station is known and sent to the rover, so the precise satellite-to-reference-station distance can be computed and determined by the rover. From the set of measured satellite-to-reference station pseudoranges (and the location) and the set of measured satellite-to-rover pseudoranges, the rover can determine the common mode errors observed on the measurements that both it and the reference station observe on each satellite and resolve its own location with much greater precision. The details of this process are well known to those skilled in the art.

Noteworthy in block 144 is the fact that the model yields a representation of the measured distance between the satellite and the reference station, not the error in that distance. If the model yielded a representation of the error, then the rover would be required to use exactly the same satellite ephemeris data as the reference station, in order to avoid corruption of the error corrections by potentially significant differences between ephemerides. But since the model yields a representation of the measured distance, the rover is free to utilize any ephemeris data to which it has access. There are conceivable embodiments in which the rover has access to different or better quality ephemerides than does the reference station, and these situations are automatically accommodated by the present invention.

Thus, transmitting the raw observed pseudorange measurements of each satellite from the reference station, as well as the reference station location in a common coordinate system to the rover, is all that is needed in order to compute the corrections for the rover. Alternatively, the reference station can compute its own position based solely on its own measurements, compare this result to its a priori known position, and use this to determine the corrections. In still other common embodiments, the determination of the rover position from this data occurs at a third location as suits the application.

The need for constantly transmitting this measurement or corrections data heretofore has required significant data transfers and stresses the limited-bandwidth channels. And the rover is subject to operating disruptions whenever such transmissions are disturbed. It is the object of present principles to overcome these limitations by an effective form of compression by substituting parameters of the present models for the raw measurements which can then be reconstructed at will for the measurement moment of interest to the rover.

Figure 12:
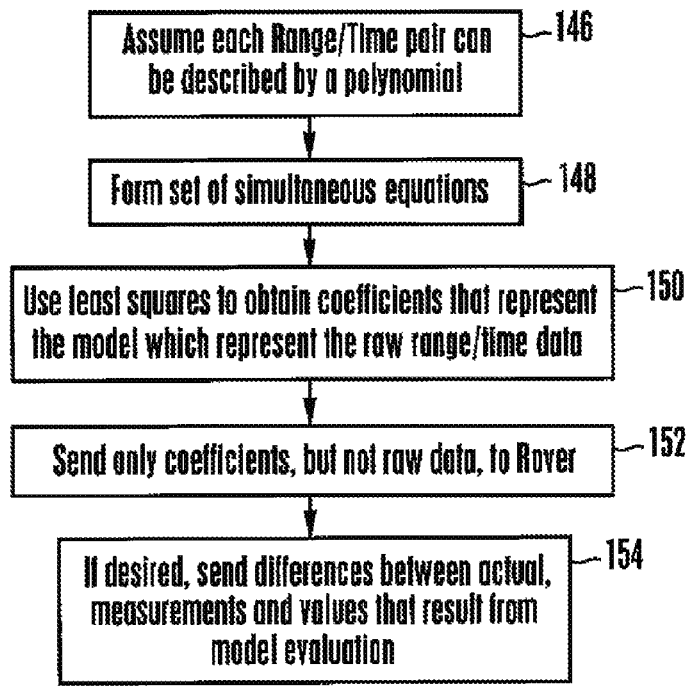

FIG. 12 provides an example flow chart of more detailed logic that may be used by the reference station 104 to generate model outputs for use as error correction information by the rover 106. Commencing at block 146, for each temporal slide or hop of the windows discussed above, the logic moves to block 148 in which each range/time pair in both windows (past history in the Observation Window and future estimated ranges/times in the Lookahead Window) are described using, as an example, the polynomial described above. The result, as indicated at block 150, is a set of simultaneous equations set forth previously. A technique such as the use of least squares fitting may be applied at block 152 to obtain polynomial coefficients that represent the raw range/time data. At block 154 only the coefficients, but not the underlying raw range/time data, are sent to the rover 106. If desired, along with the coefficients the residual differences between the measured pseudoranges and the ranges obtained by evaluation of the model may be sent to the rover 106. At the rover, an evaluation of the mathematical model represented by the coefficients or parameters at a measurement time are added to the residual value to form a lossless representation of the associated measurement.

In addition to the above, the following references are incorporated herein: U.S. Pat. No. 7,579,984; U.S. Pat. No. 8,134,499; "A brief review of basic GPS orbit interpolation strategies", Mark Schenewerk, *GPS Solution* 2003 6: 265-267; and "Using Interpolation and Extrapolation Techniques to Yield High Data Rates and Ionosphere Delay Estimates from Continuously Operating GPS Networks", Gerald L. Mader and Michael L. Morrison, *ION GPS* 2002, 24-27 Sep. 2002, Portland, Oreg.

While the particular METHOD AND APPARATUS FOR MODELING OF GNSS PSEUDORANGE MEASUREMENTS FOR INTERPOLATION, EXTRAPOLATION, REDUCTION OF MEASUREMENT ERRORS, AND DATA COMPRESSION is herein shown and described in detail, it is to be understood that the subject matter which is encompassed by the present invention is limited only by the claims.

What is claimed is:

1. An apparatus comprising:
   processor;
   computer readable storage medium accessible to the processor and bearing instructions which when executed by the processor cause the processor to undertake logic comprising:
   establishing an observation set of plural past ranges and respective past times between first and second objects to establish past range/time pairs, wherein each range in the observation set of plural past ranges comprises a measured, derived, or predicted range;
   establishing a lookahead set of plural predicted future ranges and respective future times between the first and second objects;
   using a curve fitting routine, describing the past range/time pairs and future range/time pairs at least in part through coefficients or parameters of a mathematical model produced by the curve fitting routine; and
   outputting the coefficients or parameters to a third object to enable the third object to correct errors, common to both the second object and the third object, in range measurements, derivations, or predictions.

2. The apparatus of claim 1, wherein a latest time in the set of past ranges is prior to an earliest time in the set of predicted future ranges such that the set of past ranges is temporally separated from set of predicted future ranges by a separation period.

3. The apparatus of claim 1, wherein ranges in the past range/time pairs described by the coefficients or parameters of the mathematical model are measured, derived, or predicted ranges, and the instructions when executed by the processor cause the processor to undertake logic further comprising:
   outputting, with the coefficients, a set of residual values each representing a respective difference between a measured range at an associated time and an evaluated range at the associated time of the measured range, the evaluated range being a range output by evaluation of the mathematical model.

4. The apparatus of claim 1, wherein the curve fitting routine implements a polynomial regression model that does not require a model response to pass through range/time pairs.

5. The apparatus of claim 1, wherein the second object is fixed at a reference location, the first object is an orbiting satellite transmitting the satellite position signals, and the third object is mobile.

6. A method performed by a processor executing instructions stored on a computer readable storage medium to cause the processor to perform the method, the method comprising:
   establishing an observation set of plural past ranges and respective past times between first and second objects to establish past range/time pairs, wherein each range in the observation set of plural past ranges comprises a measured, derived, or predicted range;
   establishing a lookahead set of plural predicted future ranges and respective future times between the first and second objects;
   using a curve fitting routine, describing the past range/time pairs and future range/time pairs at least in part through coefficients or parameters of a mathematical model produced by the curve fitting routine; and
   outputting the coefficients or parameters to a third object to enable the third object to correct errors, common to both the second object and the third object, in range measurements, derivations, or predictions.

7. The method of claim 6, wherein a latest time in the set of past ranges is prior to an earliest time in the set of predicted future ranges such that the set of past ranges is temporally separated from set of predicted future ranges by a separation period.

8. The method of claim 6, wherein ranges in the past range/time pairs described by the coefficients or parameters of the mathematical model are measured, derived, or predicted ranges, and wherein the method further comprises:
   outputting, with the coefficients, a set of residual values each representing a respective difference between a measured, derived, or predicted range at an associated time and an evaluated range at the associated time of the measured, derived, or predicted range, the evaluated range being a range output by evaluation of the mathematical model.

9. The method of claim 6, wherein the curve fitting routine implements a polynomial regression model that does not require a model response to pass through range/time pairs.

10. The method of claim 6, wherein the second object is fixed at a reference location, the first object is an orbiting satellite transmitting the satellite position signals, and the third object is mobile.

11. The method of claim 8, wherein the measured range and associated time are derived from the same source as the mathematical model.

12. The method of claim 8, wherein the measured range and associated time are not derived from the same source as the mathematical model.

13. The apparatus of claim 3, wherein the measured range and associated time are derived from the same source as the mathematical model.

14. The apparatus of claim 3, wherein the measured range and associated time are not derived from the same source as the mathematical model.

\* \* \* \* \*